(12) United States Patent
Carley et al.

(10) Patent No.: US 9,340,423 B2
(45) Date of Patent: May 17, 2016

(54) CATALYSTS

(75) Inventors: Albert Frederick Carley, Caerphilly (GB); Jennifer Kelly Edwards, Cardiff (GB); Graham John Hutchings, Ross-on-Wye (GB); Benjamin Eduardo Solsona Espriu, Torrent-Valencia (ES)

(73) Assignee: University College Cardiff Consultants Limited, Cardiff (GB)

( * ) Notice: Subject to any disclaimer, the term of this patent is extended or adjusted under 35 U.S.C. 154(b) by 167 days.

(21) Appl. No.: 11/995,457

(22) PCT Filed: Jul. 10, 2006

(86) PCT No.: PCT/GB2006/002546
§ 371 (c)(1),
(2), (4) Date: Aug. 26, 2008

(87) PCT Pub. No.: WO2007/007075
PCT Pub. Date: Jan. 18, 2007

(65) Prior Publication Data
US 2008/0305033 A1    Dec. 11, 2008

(30) Foreign Application Priority Data

Jul. 11, 2005 (GB) .................... 0514075.1

(51) Int. Cl.
*B01J 23/44* (2006.01)
*B01J 23/52* (2006.01)
*C01B 15/029* (2006.01)
*B01J 29/44* (2006.01)
*B01J 37/06* (2006.01)

(52) U.S. Cl.
CPC ............... *C01B 15/029* (2013.01); *B01J 23/44* (2013.01); *B01J 23/52* (2013.01); *B01J 29/44* (2013.01); *B01J 37/06* (2013.01); *B01J 2229/37* (2013.01)

(58) Field of Classification Search
CPC .................................. B01J 23/44; B01J 23/52
USPC ........................... 502/330, 339, 344; 423/584
See application file for complete search history.

(56) References Cited

U.S. PATENT DOCUMENTS 3,736,265 A * 5/1973 Suggitt .......................... 502/185
4,009,252 A    2/1977 Izumi et al.
4,302,359 A * 11/1981 Mauldin et al. ............... 502/331

(Continued)

FOREIGN PATENT DOCUMENTS

CA    2455335 A1    2/2003
EP    0009802 A1    4/1980

(Continued)

OTHER PUBLICATIONS

Li et al. "Effect of Nitric Acid Pretreatment on the Properties of Activated Carbon and Supported Palladium Catalysts." Ind. Eng. Chem. Res. 2005, 44, 5478-5482. Available online Jun. 3, 2005.*

(Continued)

*Primary Examiner* — Brian Walck
(74) *Attorney, Agent, or Firm* — King & Schickli, PLLC

(57) ABSTRACT

A catalyst effective for the direct reaction of hydrogen and oxygen to form hydrogen peroxide includes particles of gold, palladium or, preferably, gold and palladium deposited upon an acid-washed support. High selectivity to and production of hydrogen peroxide is observed, with low hydrogen peroxide decomposition. The catalysts have extended lifespan.

6 Claims, 2 Drawing Sheets

(56) References Cited

U.S. PATENT DOCUMENTS

| | | | |
|---|---|---|---|
| 4,490,481 A * | 12/1984 | Boitiaux et al. | 502/330 |
| 4,832,938 A | 5/1989 | Gosser et al. | |
| 5,135,731 A | 8/1992 | Gosser et al. | |
| 5,449,655 A | 9/1995 | Albers et al. | |
| 5,505,921 A | 4/1996 | Luckoff et al. | |
| 5,629,462 A * | 5/1997 | Rao | 570/176 |
| 5,853,693 A | 12/1998 | Ogasawara et al. | |
| 6,126,914 A | 10/2000 | Ogasawara et al. | |
| 6,168,775 B1 | 1/2001 | Zhou et al. | |
| 6,207,128 B1 | 3/2001 | Sellin et al. | |
| 6,534,440 B2 * | 3/2003 | Choudhary et al. | 502/333 |
| 6,958,138 B1 | 10/2005 | Devic | |
| 7,045,481 B1 * | 5/2006 | Parasher et al. | 502/150 |
| 2003/0114719 A1 * | 6/2003 | Fischer et al. | 568/881 |

FOREIGN PATENT DOCUMENTS

| | | |
|---|---|---|
| EP | 0 049 810 A1 | 4/1982 |
| EP | 0 616 846 A1 | 9/1994 |
| EP | 0 978 316 A1 | 2/2000 |
| FR | 2 796 312 A1 | 1/2001 |
| JP | 55-0419145 A | 4/1980 |
| JP | 6-510514 A | 11/1994 |
| JP | 9-2410009 A | 9/1997 |
| JP | 09-271670 A | 10/1997 |
| JP | 2002-029711 A | 8/2003 |
| PA | 0 117 306 A1 | 9/1984 |

OTHER PUBLICATIONS

Philip Landon et al., "Direct formation of hydrogen peroxide from $H_2/O_2$ using a gold catalyst," *Chem. Commun.*, 2002, pp. 2058-2059.

Philip Landon et al., "Direct synthesis of hydrogen peroxide from $H_2$ and $O_2$ using Pd and Au catalysts," *Phys. Chem. Chem. Phys.*, 2003, 5, pp. 1917-1923.

* cited by examiner

CATALYSTS

CROSS REFERENCE TO RELATED APPLICATIONS

This application is the U.S. National Phase application of PCT International Application No. PCT/GB2006/002546, filed Jul. 10, 2006, and claims priority of British Patent Application No. 0514075.1, filed Jul. 11, 2005.

FIELD OF THE INVENTION

The present invention concerns improvements in catalysts especially for hydrogen peroxide production; more especially it concerns the catalytic production of hydrogen peroxide by direct reaction of hydrogen and oxygen.

BACKGROUND OF THE INVENTION

The standard large scale production method for hydrogen peroxide involves the use of anthraquinone as an intermediate. This process is energy-intensive. There has been considerable study over the last 10 to 15 years of alternative processes for direct oxidation of hydrogen by oxygen, but these have not, to our knowledge, been successfully commercialised. There are understandable concerns over the danger of operating with explosive mixtures of hydrogen and oxygen. As examples of recent publications in this field, we mention in particular U.S. Pat. No. 5,135,731, in which gases containing hydrogen and oxygen are reacted in the presence of an aqueous reaction medium, an acid, a promoter, a multifunctional phosphonate and a catalyst, for example Pd and/or Pt which may be on a support such as carbon, alumina, silica, ion exchange resins and other conventional supports. U.S. Pat. No. 4,832,938 is another concept which involves reacting hydrogen with oxygen in an aqueous reaction medium having no, or less than 2%, organic content, a source of protons and chlorine or bromine ions and a combined Pt/Pd catalyst. The catalyst may be supported on carbon, silica or alumina. U.S. Pat. No. 4,009,252 also describes an aqueous medium system using a platinum group metal catalyst.

More recently, Landon et al have published a paper in Phys. Chem. Chem. Phys. 5 (2003) 917 studying a variety of Au and Pd catalysts, and disclosing that a gold alloy catalyst, specifically 5 wt % Au—Pd (1:1 wt %) supported on alumina is an active catalyst for $H_2O_2$ formation. Trials were carried out using a reaction medium including supercritical $CO_2$, but overall yields were low because of $H_2O_2$ decomposition. Although this academic work is interesting, it seems that high selectivities to $H_2O_2$ of 80-90% can be achieved at low temperatures of the order of 1-2° C. but only with low overall yields. Such low temperatures result in an energy-intensive process.

Two other patent documents are U.S. Pat. No. 5,449,655 and EP 0 049 810. U.S. Pat. No. 5,449,655 discloses that activated carbon catalyst supports may be acid-washed to reduce the ash content, and that a further treatment is desirable to improve the catalytic performance for hydrogenation of organic molecules after deposition of a platinum group metal on the supports. The further treatment suitably involves treatment with an oxidising agent such as hydrogen peroxide. This document does not have any relevance to the formation of catalysts for hydrogen peroxide formation by direct reaction of hydrogen and oxygen. EP 0 049 810 is concerned with an improvement in hydrogen peroxide production, using a palladium or palladium-gold catalyst supported catalyst, by selecting catalysts that show decreased hydrogen peroxide decomposition. The improved catalyst is prepared by pre-treatment of the catalyst with an aldehyde or a ketone and/or hydrochloric acid.

SUMMARY OF THE INVENTION

There remains a need for a commercially viable catalyst and commercially viable direct reaction process for the production of $H_2O_2$. The present invention relates not to the pre-treatment of the catalyst before use in the hydrogen peroxide process, but in the pre-treatment of the support, before formation of the catalyst.

Accordingly, the present invention provides an $H_2O_2$ formation catalyst comprising particles of gold, palladium or, preferably, gold and palladium, deposited on a support which has been acid washed prior to metal deposition. Preferably the particles are of gold and palladium, which may, on certain supports, have a gold-rich core and a palladium-rich shell.

DETAILED DESCRIPTION OF THE INVENTION

Figure 1:
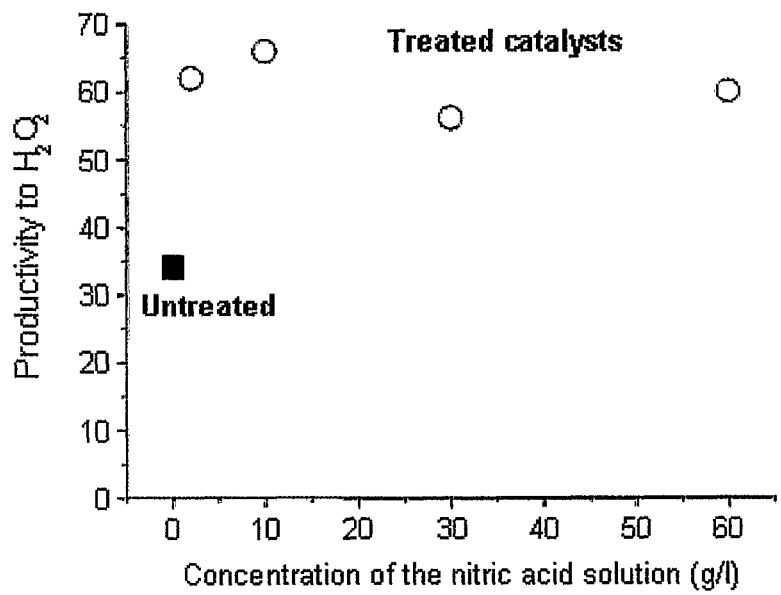
FIG. 1 is a graph comparing $H_2O_2$ productivity (mol/kg$_{cat}$/hr) with the same carbon washed with varying concentrations of nitric acid.

The invention provides an $H_2O_2$ formation catalyst. The catalyst provides particles of gold or, preferably, gold and palladium, deposited on a support. The support has been acid washed prior to metal deposition. Preferably, the particles are of gold and palladium, which may, on certain supports, have a gold-rich core and a palladium-rich shell.

The support is preferably an inorganic support material, preferably $SiO_2$, $TiO_2$, $Al_2O_3$ or $Fe_2O_3$, or may be an activated carbon. Acid washing is suitably carried using a mineral acid such as hydrochloric acid or nitric acid. Preferably the acid is dilute nitric acid, and supports are treated for example for 3 hours at ambient temperature. Experimental procedures involved washing supports in various concentrations of acid (see FIG. 1 below). It may be desirable to use a zeolite support, and synthetic zeolites such as beta zeolite or ZSM-5 are indicated, while tests indicate that zeolite Y tends to collapse.

As used herein, the "core" and "shell" description particularly includes situations where the physical core of a catalyst particle is an acid-washed catalyst support, having deposited on its surface metal nanoparticles where there has been migration of gold towards the core of the nanoparticles and palladium towards the surface of the nanoparticles. Thus a palladium-rich shell surrounds a gold-rich core. Conveniently, the core contains 50 at % or more of gold, and the shell contains 50 at % or more of palladium.

In initial tests, the alloyed catalysts had a 2.5Au-2.5Pd wt % loading, with comparative Au and Pd monometallic catalysts having 2.5 wt % and 5 wt % loadings. Other metal loadings may be considered, especially during catalyst development directed to precious metal "thrifting".

The present invention further provides a method of manufacture of such a catalyst according to the invention, comprising acid washing a catalyst support, depositing gold and/or palladium, conveniently gold and palladium simultaneously, onto the washed support to form a catalyst precursor, and subsequently heat-treating, preferably at a temperature of 400° C. or above, the catalyst precursor to form a catalyst comprising the gold, palladium or gold and palladium particles.

The present invention also provides a process for the production of $H_2O_2$, comprising reacting hydrogen with oxygen in the presence of a reaction medium, preferably an aqueous reaction medium, and in the presence of a catalyst according to the invention.

The reaction medium is conveniently a water/organic solvent mix, where the organic solvent is water miscible. Solvents such as methanol, ethanol, isopropyl alcohol and acetone are suitable. In certain tests an acetone/water mix has been found to increase the activity of the bi-metallic catalyst (see Table 1 below). However, studies into different solvents (isopropyl alcohol, ethanol) showed no promotion of the catalyst activity. Studies into solvent effects have to be carried out with due care due to the possible formation of organic peroxy species, but studies by $^1H$ NMR and $^{13}C$ NMR with acetone and methanol have shown conclusively that under the conditions as stated in Table 1 there is no formation of such species.

EXAMPLES

Example 1 (Comparative)

2.5 wt % Au-2.5 wt % Pd catalysts were prepared by impregnation of suitable support materials: carbon (commercially available G60), silica and $TiO_2$ (mainly anatase). An incipient wetness method using aqueous solutions of $PdCl_2$ (Johnson Matthey) and $HAuCl_4.3H_2O$ (Johnson Matthey) was employed. The paste formed was ground and dried at 80° C. for 16 h and calcined in static air, typically at 400° C. for 3 h.

10 mg of the supported 2.5 wt % Au-2.5 wt % Pd catalyst were charged in an autoclave containing solvent (5.6 g MeOH and 2.9 g $H_2O$), which was then filled with 5% $H_2/CO_2$ and 25% $O_2/CO_2$ to give a hydrogen to oxygen ratio of 1:2, at a total pressure of 3.7 MPa at 20° C. Stirring (1200 rpm) was started on reaching the desired temperature (2° C.), and experiments were carried out for 30 min. Gas analysis for $H_2$ and $O_2$, was performed by gas chromatography using a thermal conductivity detector. Conversion of $H_2$ was calculated by gas analysis before and after reaction. $H_2O_2$ yield was determined by titration of aliquots of the final filtered solution with acidified $Ce(SO_4)_2$ ($7 \times 10^{-3}$ mol/l). $Ce(SO_4)_2$ solutions were standardised against $(NH_4)_2Fe(SO_4)_2.6H_2O$ using ferroin as indicator. The following results were obtained:

TABLE 1

Table 1 Effect of solvent and temperature on $H_2O_2$ synthesis - all catalysts calcined in air 400° C. 3 hours.

| Catalyst | Solvent | Temperature/° C. | Productivity Mol/kg$_{cat}$/hr | $H_2O_2$ decomposition$^a$ % |
|---|---|---|---|---|
| 2.5-2.5%Au—Pd/ HZSM-5 | Water + Methanol | 2 | 52 | nd |
| 2.5-2.5%Au—Pd/ HZSM-5 10%HNO3 | Water + Methanol | 2 | 87 | Nd |
| 2.5-2.5%Au—Pd/ TiO$_2$ | Water + Methanol | 2 | 64 | 30 |
| 2.5-2.5%Au—Pd/ TiO$_2$ | Water + Methanol | 20 | 25 | 70 |
| 2.5-2.5%Au—Pd/ TiO$_2$ 2%HNO$_3$ | Water + Methanol | 2 | 80 | ca 5 |
| 2.5-2.5%Au—Pd/ TiO$_2$ 2%HNO$_3$ | Water + Methanol | 20 | 100 | 35 |
| 2.5-2.5%Au—Pd/ TiO$_2$ 2% HNO$_3$ | Water + Acetone | 2 | 95 | 13 |
| 2.5-2.5%Au—Pd/ TiO$_2$ 2% HNO$_3$ | Water + Acetone | 20 | 125 | Nd |
| 2.5-2.5%Au—Pd/ TiO$_2$ 2% HNO$_3$ | Water + Acetone | 40 | 64 | Nd |

Note
water is 2.9 g in all cases-solvent 5.6 g

Note
$^a$ $H_2O_2$ decomposition experiments; 0.5 wt % $H_2O_2$ added at start, no $O_2$ Using the nitric acid washed $TiO_2$ catalyst results in activity in temperatures 2° C.-40° C. (table 1) without suffering a major loss in activity, in comparison to the non acid washed catalyst.

Other aspects of the present invention are disclosed in the Examples below.

| Catalyst | Productivity Mol/kg$_{cat}$-h |
|---|---|
| 2.5%Au2.5%Pd/TiO$_2$ | 64 |
| 2.5%Au2.5%Pd/Al$_2$O$_3$ | 15 |

-continued

| Catalyst | Productivity Mol/kg$_{cat}$-h |
|---|---|
| 2.5%Au2.5%Pd/G60 | 110 |
| 2.5%Au2.5%Pd/SiO$_2$ | 108 |

Example 2

The supports were acid-treated (3 h, 100 ml) prior to impregnation of Au and Pd (as described in Example 1) and hydrogen peroxide synthesis measured as described in Example 1. A reference sample washed for 3 h in pure water was also tested. The following results were obtained:

| Catalyst | Pre-treatment | Selectivity % | Productivity Mol/kg$_{cat}$-h |
|---|---|---|---|
| 2.5%Au—2.5%Pd/G60 | None | 80 | 110 |
| 2.5%Au—2.5%Pd/G60 | Water | 80 | 112 |
| 2.5%Au—2.5%Pd/G60 | 2%HNO$_3$ | >98 | 160 |
| 2.5%Au—2.5%Pd/G60 | 2%H$_3$PO$_4$ | 30 | 120 |
| 2.5%Au—2.5%Pd/G60 | 2%HCl | 15 | 130 |
| 2.5%Au—2.5%Pd/G60 | 2%NH$_4$OH | 24 | 70 |
| 2.5%Au—2.5%Pd/G60 | 2%CH$_3$COOH | >98 | 175 |
| 2.5%Au—2.5%Pd/G60 | 1N HCl* | 20 | 30 |
| 2.5%Au—2.5%Pd/G60 | 1N HNO$_3$* | 80 | 110 |
| 2.5%Au—2.5%Pd/TiO$_2$ | None | 61 | 64 |
| 2.5%Au—2.5%Pd/TiO$_2$ | Water | 95 | 80 |
| 2.5%Au—2.5%Pd/SiO$_2$ | None | 80 | 108 |
| 2.5%Au—2.5%Pd/SiO$_2$ | Water | 73 | 185 |

*Catalyst was prepared on untreated carbon with 1N HCl or HNO$_3$ present during impregnation.

Example 3

The solvent and solvent/water composition was varied and hydrogen peroxide synthesis measured (as in Example 1) for the catalysts formed from the G60 acid-treated and water treated supports. All catalysts were calcined in static air 400° C. 3 hrs. The results were as follows:

| Catalyst | Pre-treatment | Solvent | Productivity Mol/kg$_{cat}$-h |
|---|---|---|---|
| 2.5-2.5%Au—Pd/TiO$_2$ | Water | Methanol/Water | 64 |
| 2.5-2.5%Au—Pd/TiO$_2$ | 2%HNO$_3$ | Methanol/Water | 80 |
| 2.5-2.5%Au—Pd/TiO$_2$ | 2%HNO$_3$ | Acetone/water | 95 |
| 2.5%Au2.5%Pd/G60 | Water | Methanol/Water* | 118 |
| 2.5%Au2.5%Pd/G60 | 2%HNO$_3$ | Methanol/Water* | 160 |
| 2.5%Au2.5%Pd/G60 | Water | Ethanol/Water* | 100 |
| 2.5%Au2.5%Pd/G60 | 2%HNO$_3$ | Ethanol/Water* | 200 |
| 2.5%Au2.5%Pd/G60 | 2%HNO$_3$ | Ethanol/Water** | 60 |
| 2.5%Au2.5%Pd/G60 | Water | Water | 31 |
| 2.5%Au2.5%Pd/G60 | 2%HNO$_3$ | Water | 33 |
| 2.5%Au2.5%Pd/TiO$_2$ | Water | Water | 30 |
| 2.5%Au2.5%Pd/TiO$_2$ | 2%HNO$_3$ | Water | 32 |

*74% alcohol by weight, Methanol/Water, Ethanol/Water same molar ratio
**5% alcohol by weight Example 4

Examples of the supports and impregnated catalysts were tested for hydrogen peroxide decomposition. All catalysts were calcined in static air 400° C. 3 hr. The following results were obtained:

| Support | Pre-treatment | H$_2$O$_2$Productivity (mol/Kg$_{cat}$-h) | Decomposition (%)* catalyst | Decomposition (%)* support |
|---|---|---|---|---|
| AC[1] | None | 110 | 20 | 40[a], 38[b] |
| AC[1] | Water | 112 | 21 | 39 |
| AC[1] | 2%HNO$_3$ | 160 | 1.8 | 15[a], 0[b] |
| TiO$_2$[2] | None | 64 | 30 | 20[a] |
| TiO$_2$[2] | Water | 64 | 32 | 20[a], 19[b] |
| TiO$_2$[2] | 2%HNO$_3$ | 95 | 5 | 0[a], 0[b] |

*Hydrogen peroxide decomposition over 2.5wt%Au—2.5wt%Pd catalyst or the support: H$_2$O$_2$ (0.4 wt. %) in a methanol/water solution (CH$_3$OH, 5.6 g; H$_2$O 2.9 g) reacted with 420 psi H$_2$ for 30 min at 2° C.
[1]2.5%Au2.5%Pd/G6O activated carbon (Aldrich)
[2]TiO$_2$ (P25) ex Degussa
[a]Decomposition over fresh support
[b]Decomposition over once-used support
[a]Decomposition over fresh support
[b]Decomposition over used support Example 5

The catalyst supports detailed in Example 1 were treated with nitrate salts (sodium, potassium and ammonium) before impregnation with Au and Pd and tested for hydrogen peroxide synthesis (as described in Example 1). All catalysts were calcined in static air 400° C. 3 hr. The following results were obtained:

| Catalyst | Pre-treatment | Productivity Mol/kg$_{cat}$-h |
|---|---|---|
| 2.5%Au2.5%Pd/G60 | None | 118 |
| 2.5%Au2.5%Pd/G60 | 2%HNO$_3$ | 160 |
| 2.5%Au2.5%Pd/G60 | 2%NaNO$_3$ | 122 |
| 2.5%Au2.5%Pd/G60 | 2%KNO$_3$ | 120 |
| 2.5%Au2.5%Pd/G60 | 2%NH$_4$NO$_3$ | 115 |

Example 6

Figure 4:
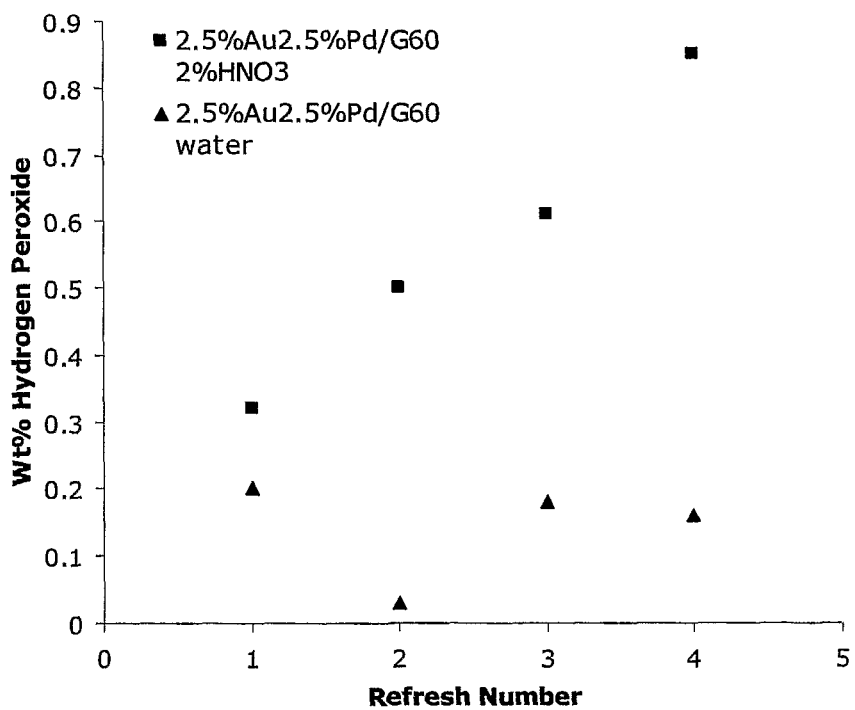
FIG. 4 is a graph of the selectivity of $H_2O_2$ in wt% for an acid-washed and a non-acid-washed support per refresh number.

Hydrogen peroxide synthesis was carried out with a 2.5 wt % Au-2.5 wt % Pd catalyst supported on G60 acid-treated and water treated carbon calcined in air 400° C. 3 hrs air. The autoclave was vented at 30 minute intervals, the hydrogen peroxide concentration measured, and the gas mixture refilled and the synthesis allowed to continue. The results obtained are shown in FIG. 4.

Example 7

Hydrogen peroxide synthesis was measured as in Example 1, at various reaction temperatures for a 2.5 wt % Au-2.5 wt % Pd catalyst supported on TiO$_2$— acid-treated and water treated—followed by calcinations in air at 400° C. for 3 hrs. The following results were obtained:

| Catalyst | Pre-treatment of support | Solvent | Temperature/° C. | Productivity Mol/kg$_{cat}$-h |
|---|---|---|---|---|
| 2.5-2.5%Au—Pd/TiO$_2$ | Water | Water + Methanol | 2 | 64 |
| 2.5-2.5%Au—Pd/TiO$_2$ | Water | Water + Methanol | 20 | 25 |
| 2.5-2.5%Au—Pd/TiO$_2$ | Water | Water + Methanol | 40 | 10 |
| 2.5-2.5%Au—Pd/TiO$_2$ | 2%HNO$_3$ | Water + Methanol | 2 | 80 |

-continued

| Catalyst | Pre-treatment of support | Solvent | Temperature/ °C | Productivity Mol/ $kg_{cat}$-h |
|---|---|---|---|---|
| 2.5-2.5%Au—Pd/ $TiO_2$ | 2%$HNO_3$ | Water + Methanol | 20 | 100 |
| 2.5-2.5%Au—Pd/ $TiO_2$ | 2%$HNO_3$ | Water + Methanol | 40 | 60 |
| 2.5-2.5%Au—Pd/ $TiO_2$ | 2%$HNO_3$ | Water + Acetone | 2 | 95 |
| 2.5-2.5%Au—Pd/ $TiO_2$ | 2%$HNO_3$ | Water + Acetone | 20 | 125 |
| 2.5-2.5%Au—Pd/ $TiO_2$ | 2%$HNO_3$ | Water + Acetone | 40 | 64 |

Catalyst testing was performed using a Parr Instruments stainless steel autoclave with a nominal volume of 50 ml and a maximum working pressure of 14 MPa. The autoclave was equipped with an overhead stirrer (0-2000 rpm) and provision for measurement of temperature and pressure. Typically, the autoclave was charged with catalyst (0.01 g unless otherwise stated), solvent (5.6 g MeOH/Acetone and 2.9 g $H_2O$) purged three times with $CO_2$ (3 MPa) and then filled with 5% $H_2/CO_2$ and 25% $O_2/CO_2$ to give a hydrogen to oxygen ratio of 1:2, at a total pressure of 3.7 MPa at 2° C. Stirring (1200 rpm unless otherwise stated) was started on reaching the desired temperature, and experiments were run for 30 min unless otherwise stated. $H_2O_2$ yield was determined by titration of aliquots of the final filtered solution with acidified $Ce(SO_4)_2$ ($7 \times 10^{-3}$ mol/l). $Ce(SO_4)_2$ solutions were standardised against $(NH_4)_2Fe(SO_4)_2 \cdot 6H_2O$ using ferroin as indicator.

The reaction medium may comprise other components which contribute to a desired result or avoid an undesired result. For example, hydrogen bromide may be added to reduce the tendency for $H_2O$ formation at higher temperatures, causing an increase in yield due to decreased decomposition (thus stabilisation) of the $H_2O_2$. Addition of HCl and $HNO_3$ will induce the same stabilisation. However, the presence of halides, and the effect of acid on stainless steel reaction vessels are not desirable in industry. Accordingly, it is assessed by the present inventors that a method of pre-treating a catalyst to induce the same stabilising effect without addition of these corrosive/toxic compounds would be highly desirable.

Although initial trials have been carried out in an autoclave, it is contemplated that it can operate in continuous, or semi-continuous mode. It is envisaged that the process of the invention may be optimised and scaled-up to industrial scale.

The catalysts according to the invention exhibit surprisingly long life and recyclability. The acid washed bi-metallic $TiO_2$ catalyst has been reused three times and has shown no decrease in activity (See Table 2 below, using 2.5-2.5% Au—Pd catalyst based on acid-washed $TiO_2$ support)

TABLE 2

| Experiment | Productivity - Mol/$kg_{cat}$/hr |
|---|---|
| Initial | 110 |
| $1^{st}$ reuse | 107 |
| $2^{nd}$ reuse | 108 |
| $3^{rd}$ reuse | 105 |

Further initial tests have been undertaken using acid-washed activated carbon supports, after depositing 2.5 wt % Au and 2.5 wt % Pd and heat treating at 400° C. for three hours in air. An untreated carbon support was compared for $H_2O_2$ productivity (mol/$kg_{cat}$/hr) with the same carbon washed with varying concentrations of nitric acid. The results are shown in FIG. 1.

Figure 2:
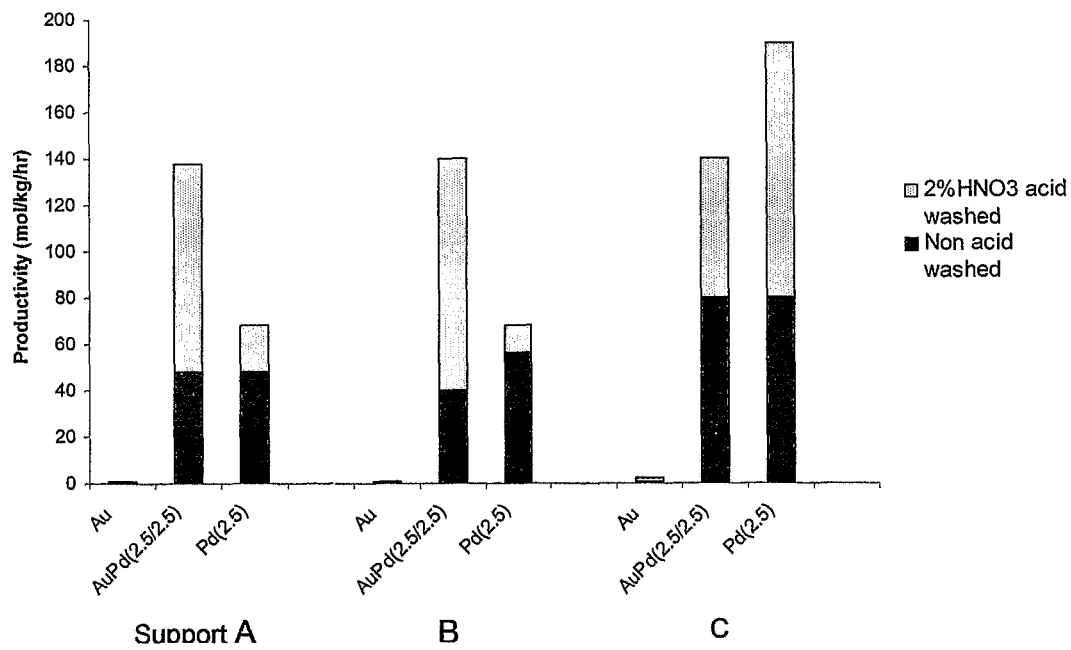
FIG. 2 is a bar graph representing $H_2O_2$ productivity for three different silica supports, both without acid washing and after a pretreatment with 2% nitric acid.

The influence of support source, and of the composition of metal particles deposited thereon was assessed, by measuring $H_2O_2$ productivity for three different silica supports, for Au-only catalysts, Pd-only catalysts and an AuPd catalyst, both without acid washing and after a pre-treatment with 2% nitric acid. The results are shown in FIG. 2. The beneficial effects of acid washing are clear for all supports, and an increase of activity is observed for all catalysts, whether Au only, Pd only or Au and Pd.

Figure 3:
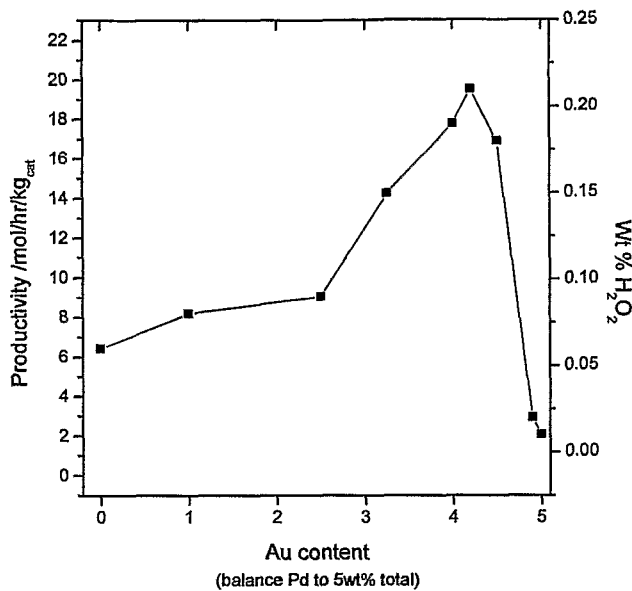
FIG. 3 is a graph of $H_2O_2$ productivity per wt% Au/Pd for non-acid-washed alumina supported catalysts per wt% $H_2O_2$.

FIG. 3 is a comparative test showing that the optimum wt % Au/Pd for non-acid-washed alumina supported catalysts is 4.2% Au:0.8% Pd, or approximately 5.25:1. It is expected that the same proportion will apply in the case of acid-washed supports.

The process according to the invention has, in preliminary trials, demonstrated high yields and/or high selectivity to $H_2O_2$. Preliminary results for operating the process at or around room temperature indicate that selectivities of greater than 90% can be achieved, and production rates of around 500 mol/$kg_{cat}$/hr can be achieved when operating under preferred conditions.

The invention claimed:

1. A method of manufacturing a $H_2O_2$ formation catalyst, consisting essentially of the steps of acid washing a catalyst support, depositing a precursor of at least one of gold and palladium onto the acid washed support to form a catalyst precursor and subsequently calcining in air the catalyst precursor to form the $H_2O_2$ formation catalyst comprising particles of at least one of gold and palladium deposited on said support, wherein the calcining is carried out at a temperature of at least 400° C.

2. A method of manufacturing a catalyst according to claim 1, wherein the at least one of gold and palladium is both gold and palladium.

3. A method of manufacturing a catalyst according to claim 1, wherein the support is silica, titania, alumina, $Fe_2O_3$, a zeolite or an activated carbon.

4. A method of manufacturing a catalyst according to claim 1, wherein the support has been washed with nitric acid.

5. A method of manufacturing a catalyst according to claim 2, wherein the weight ratio of gold and palladium in the catalyst is approximately 5.25:1.

6. A method of manufacturing a $H_2O_2$ formation catalyst, consisting essentially of the steps of acid washing a catalyst support made from a material selected from a group consisting of silica, titania, alumina, $Fe_2O_3$ or a zeolite, depositing a precursor of at least one of gold and palladium onto the acid washed support to form a catalyst precursor and subsequently calcining in air the catalyst precursor to form the $H_2O_2$ formation catalyst comprising particles of at least one of gold and palladium deposited on said support, wherein the calcining is carried out at a temperature of at least 400° C.

* * * * *